United States Patent [19]
Morris et al.

[11] Patent Number: 5,764,900
[45] Date of Patent: Jun. 9, 1998

[54] SYSTEM AND METHOD FOR COMMUNICATING DIGITALLY-ENCODED ACOUSTIC INFORMATION ACROSS A NETWORK BETWEEN COMPUTERS

[75] Inventors: James E. G. Morris, San Jose; Edward A. Lerner, San Francisco, both of Calif.

[73] Assignee: Multitude, Inc., Burlingame, Calif.

[21] Appl. No.: 743,828

[22] Filed: Nov. 5, 1996

[51] Int. Cl.⁶ .................................................. G06F 13/00
[52] U.S. Cl. .............................. 395/200.33; 395/220.34; 395/200.47; 395/872
[58] Field of Search .................. 395/200.33, 200.39, 395/872, 876, 200.97, 877

[56] References Cited

U.S. PATENT DOCUMENTS

3,991,265  11/1976  Fukuda et al. ............................ 386/104
5,533,017   7/1996  Thor .......................................... 370/60
5,572,677  11/1996  Luther et al. ......................... 395/200.04
5,703,889  12/1997  Shimoda et al. .......................... 371/55

*Primary Examiner*—Mehmet B. Geckil
*Attorney, Agent, or Firm*—Carr & Ferrell LLP

[57] ABSTRACT

A system for communicating digitally-encoded acoustic information across a computer network between computers. The system includes a plurality of client computers coupled together via a computer network. Each client computer includes a communications interface, memory, a sound processor and a sound mixer. The communications interface is coupled to the computer network and receives digitally-encoded acoustic signals from the other client computers attached to the computer network. The memory is coupled to the communications interface and stores separately the received acoustic signals. The sound processor is coupled to the memory and enhances separately the stored acoustic signals. The sound mixer is coupled to the sound processor and mixes the enhanced acoustic signals to produce a mixed acoustic signal.

34 Claims, 7 Drawing Sheets

SYSTEM AND METHOD FOR COMMUNICATING DIGITALLY-ENCODED ACOUSTIC INFORMATION ACROSS A NETWORK BETWEEN COMPUTERS

BACKGROUND OF THE INVENTION

1. Field of the Invention

This invention relates generally to computer networks, and more particularly to a system and method for communicating digitally-encoded acoustic signal information across a network between computers.

2. Description of the Background Art

Network communication systems enable users to pass sounds across computer networks between computers. A typical network communication system includes computers coupled via a computer network to each other and to a network server. Each computer uses a microphone to convert computer user-generated sounds to digitally-encoded acoustic signals. Each computer typically formats the generated acoustic signal into packets including a destination computer address, and forwards the packets via the computer network to the network server. The network server mixes each received acoustic signal and forwards the acoustic signals to the proper destination computers. The destination computer uses a speaker to convert the received mixed acoustic signal to sound.

For example, a typical network communication system may include two computers in communication with a destination computer. When the users concurrently speak into their microphones, their respective computers each packet and forward the generated acoustic signals to a network server. The network server mixes the concurrently-generated acoustic signals being sent to the particular destination computer, and forwards the mixed acoustic signal to the destination computer. The destination computer then processes and converts the mixed signal to sound. However, since the acoustic signals have been mixed by the network server, the destination computer must process the acoustic signals as mixed. The destination computer cannot individually process the acoustic signals easily. Therefore, a system and method are needed for sending multiple digitally-encoded acoustic signals across a computer network between computers and for enabling destination computers to process received acoustic signals individually.

SUMMARY OF THE INVENTION

The present invention provides a system and method for communicating digitally-encoded acoustic information across a computer network between computers. The system includes a plurality of client computers coupled together via a computer network. Each client computer includes a communications interface, memory, a sound processor and a sound mixer. The communications interface is coupled to the computer network and receives digitally-encoded acoustic signals from the other client computers attached to the computer network. The memory is coupled to the communications interface and stores separately the received acoustic signals. The sound processor is coupled to the memory and enhances separately the stored acoustic signals. The sound mixer is coupled to the sound processor and mixes the enhanced acoustic signals to produce a mixed acoustic signal. Because the acoustic signals are stored separately in the memory of a client computer, the client computer can process each signal individually.

Further, the method of the present invention includes receiving via a computer network a first digitally-encoded acoustic signal from a first computer and a second digitally-encoded acoustic signal from a second computer. The first acoustic signal is stored in a first memory portion and the second acoustic signal is stored in a second memory portion. The stored first and second acoustic signals are processed individually, and then mixed to generate a mixed acoustic signal. The mixed acoustic signal is then converted to sound.

DETAILED DESCRIPTION OF THE PREFERRED EMBODIMENT

Figure 1:
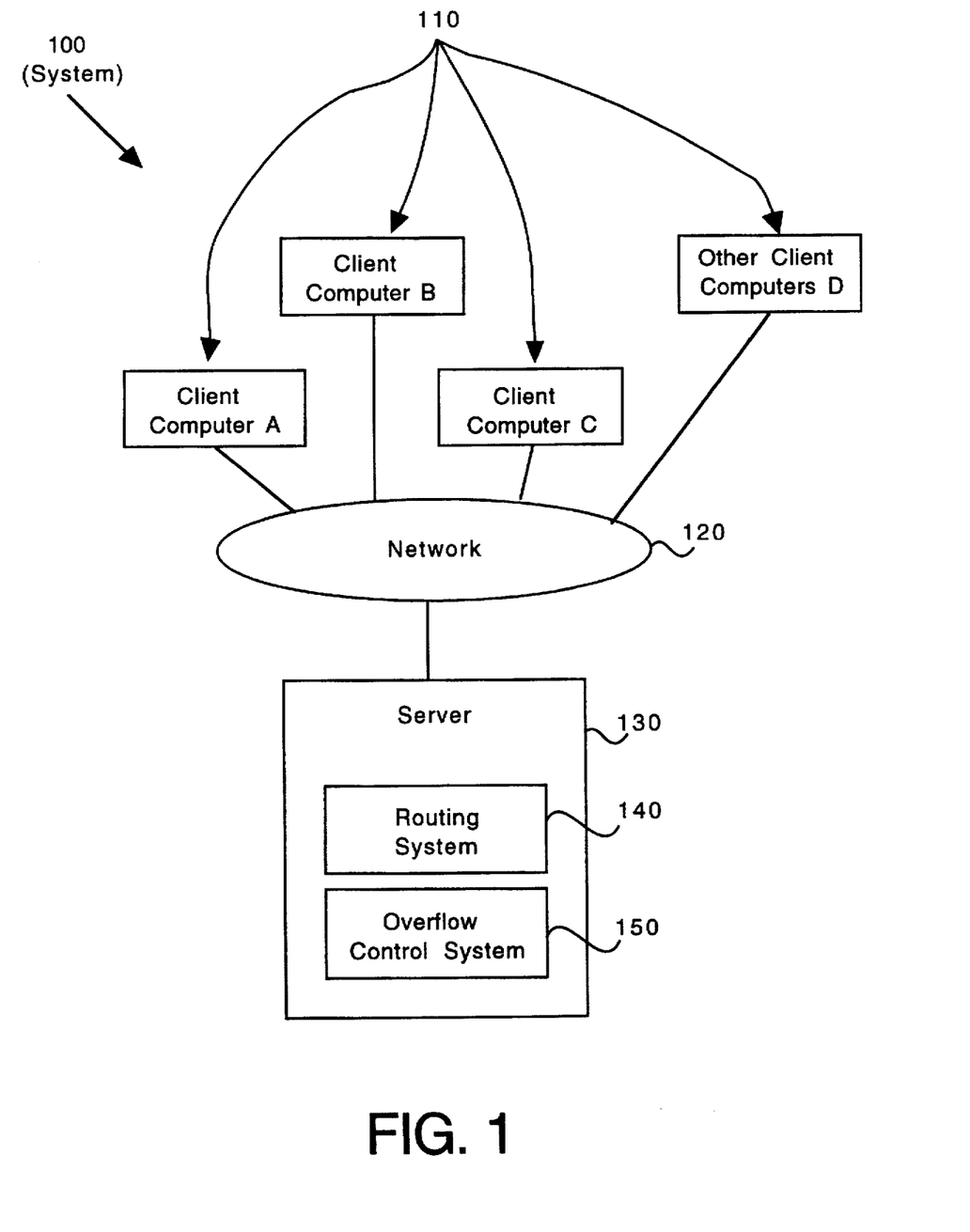
FIG. 1 is a block diagram of a network system in accordance with the present invention.

FIG. 1 is a block diagram of a network system 100 in accordance with the present invention. Network system 100 includes a plurality of client computers 110, including a client computer A, a client computer B, a client computer C and other client computers D, each coupled via a computer network 120 to a server 130. Server 130 has a routing system 140 for routing signals between client computers 110 and an overflow control system 150 for controlling the timing and the number of signals being transferred to each client computer 110. A computer 110 user can instruct routing system 140 to route signals to only selected ones of computers 110.

For example, client computer A may use a microphone to convert a sound generated by a user to a digitally-encoded acoustic signal ("acoustic signal"). Alternatively, client computer A may download an acoustic signal and use a disk drive to store it or may use a keyboard and a text-to-sound conversion algorithm to generate an acoustic signal. Client computer A forwards the acoustic signal through network 120 to server 130, which uses routing system 140 to route the acoustic signal to the other attached client computers 110, i.e., to client computer B, to client computer C and to other client computers D. Each of client computer B, client computer C and other client computers D stores the acoustic signal in a buffer.

At the same time, client computer B may generate and send a different acoustic signal to server 130, which uses routing system 140 to forward the acoustic signal to the other client computers A, C and D. Each of client computer A, client computer C and other client computers D stores the different acoustic signal in a buffer. Because the first and second acoustic signals are stored in separate buffers, the first and second acoustic signals may be processed separately.

In a war-game simulator example, each client computer 110 may be designed to control an army general and a particular army. Client computer 110 users may communicate with one another to issue bomb warnings, create alliances, etc. Since each client computer stores the acoustic signal from each separate source in a separate sound buffer, each client computer 110 can raise the volume of selected sounds, lower the volume of other sounds, output sounds from speakers which correspond with the virtual source locations of the army generals, etc. Thus, a client computer 110 may output the voice of a first army general standing on the left of a virtual battlefield from a speaker located on the left of the computer and the voice of a second army general standing on the right from a speaker located on the right. If the sounds were mixed together in server 130 before being forwarded to client computers 110, then it would be difficult or impossible to output the sounds from the speakers corresponding with the army generals' virtual source locations.

The number of storage buffers in a client computer 110 limits the number of acoustic signals the client computer 110 can process at any one time. To avoid data loss, server 130 includes an overflow control system 150 that has a program routine for controlling the timing and number of acoustic signals being sent to each client computer 110, and stores excess acoustic signals in separate server 130 buffers. For example, if client computer 110 has only four storage buffers (400, FIG. 4), overflow control system 150 limits server 130 to forwarding a maximum of four acoustic signals during the time period client computer 110 needs to process four signals. Overflow control system 150 of server 130 and storage buffers of client computer 110 are described in greater detail below with reference to FIG. 4.

Figure 2:
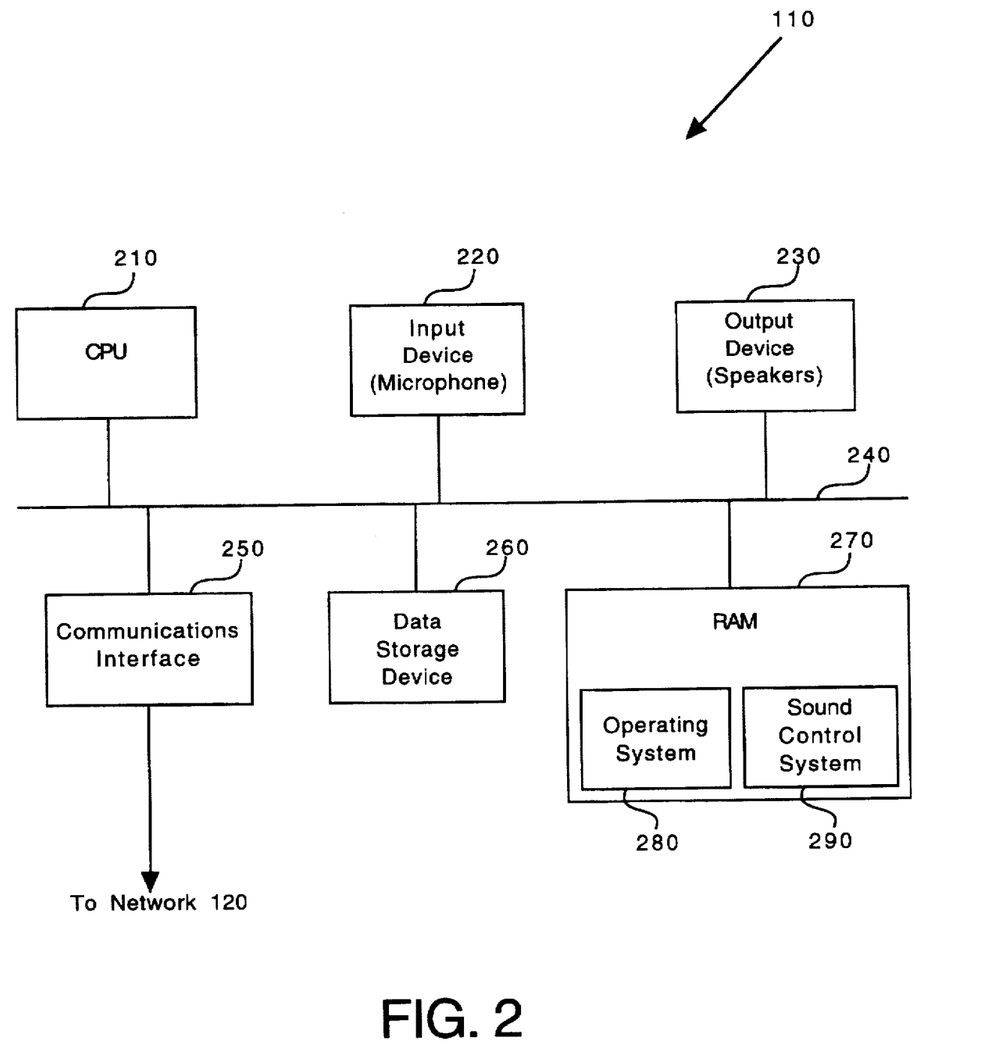
FIG. 2 is a block diagram illustrating details of a FIG. 1 client computer.

FIG. 2 is a block diagram of a client computer 110 including a Central Processing Unit (CPU) 210 such as a Motorola Power PC® microprocessor or an Intel Pentium® microprocessor. An input device 220 including a keyboard, a mouse and at least one microphone and an output device 230 including a Cathode Ray Tube (CRT) display and at least one speaker are coupled via a signal bus 240 to CPU 210. A communications interface 250, a data storage device 260 such as a magnetic disk or Read-Only Memory (ROM), and a Random-Access Memory (RAM) 270 are further coupled via signal bus 240 to CPU 210. Communications interface 250 connects to computer network 120 conventionally.

An operating system 280 controls processing by CPU 210, and is typically stored in data storage device 260 and loaded into RAM 270 for execution. A sound control system 290 routes the locally-generated acoustic signals (e.g., the signals generated by a user using microphone input device 220) to server 130. Sound control system 290 further receives and processes acoustic signals from other attached client computers 110, and then mixes the processed acoustic signals for conversion to sound by output device 230. Sound control system 290 also may be stored in data storage device 260 and loaded into RAM 270 for execution.

Figure 3:
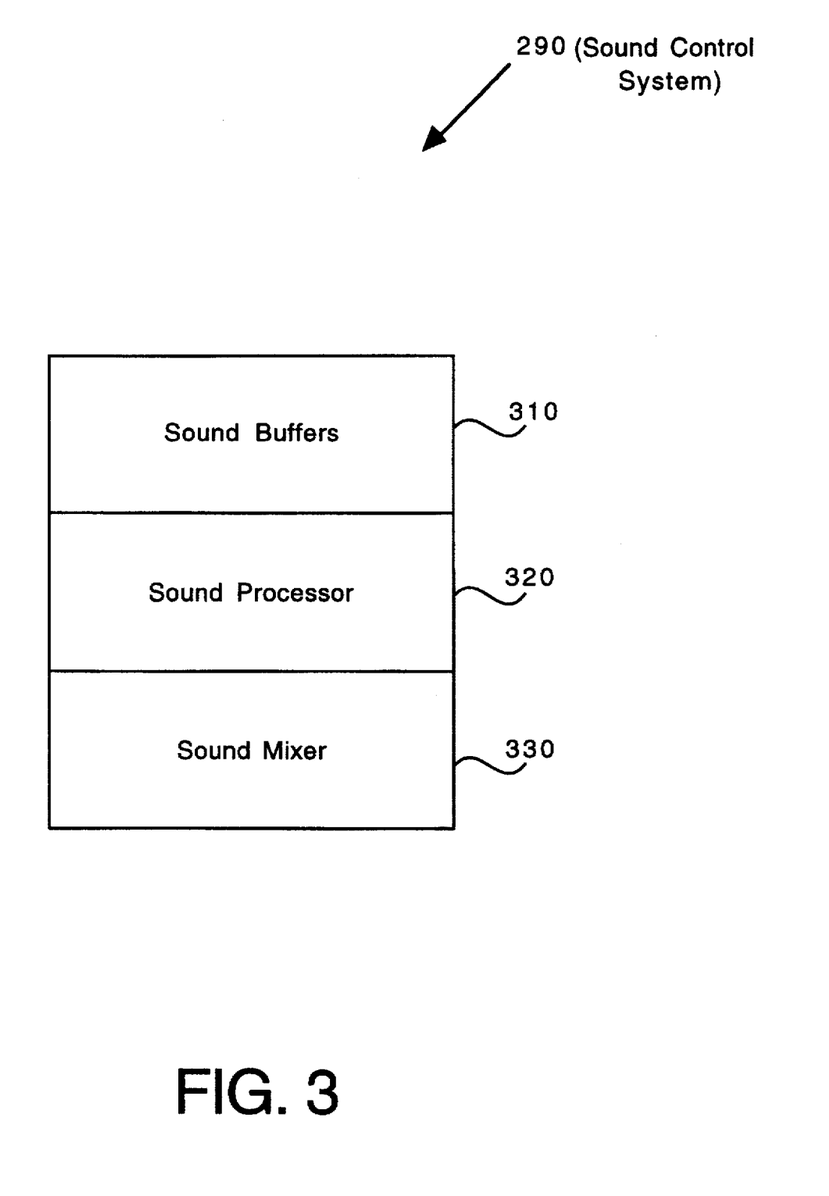
FIG. 3 is a block diagram illustrating details of the FIG. 2 sound control system.

FIG. 3 is a block diagram illustrating details of sound control system 290, which includes a plurality of sound buffers 310, a sound processor 320 and a sound mixer 330.

Sound buffers 310 include storage buffers for storing acoustic signals individually. These acoustic signals may represent user-generated sounds received from other attached client computers 110, background sounds for the virtual environment, sounds identifying incoming and outgoing client computer 110 users and other miscellaneous sounds. Each of the sounds stored in individual sound buffers 310 can be processed separately. Sound buffers 310 are described in greater detail below with reference to FIG. 4.

Figure 4:
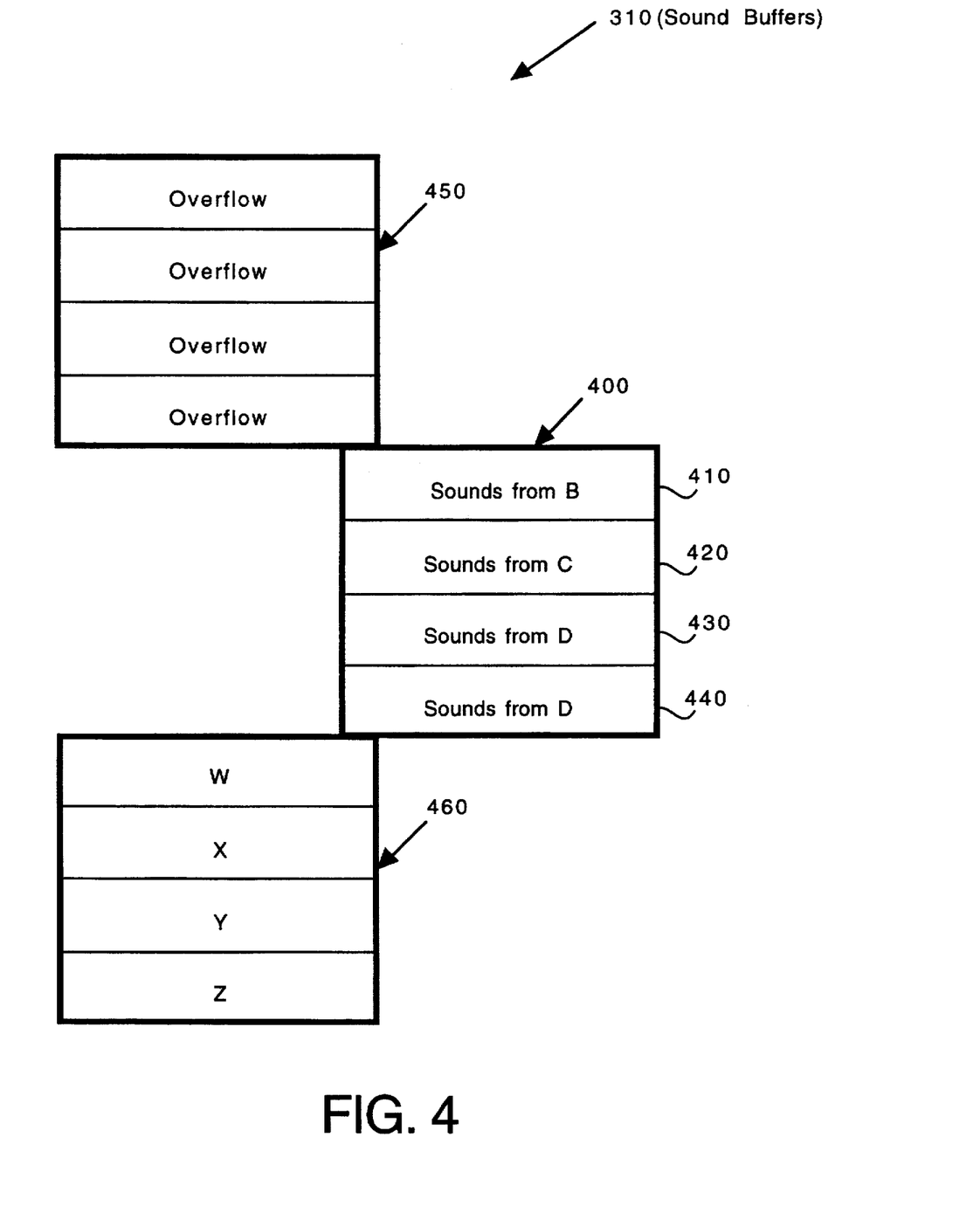
FIG. 4 is a block diagram illustrating details of the FIG. 3 sound buffers.

Sound processor 320 includes a program that communicates with communications interface 250 for forwarding locally-generated acoustic signals to, and receiving acoustic signals from, other attached client computers 110. Sound processor 320 stores the received acoustic signals individually in sound buffers 310 to enable individual processing of each acoustic signal. For example, client computer A sound processor 320 receives a first acoustic signal from client computer B and stores it in a first sound buffer 310 (FIG. 4, 410) and receives a second acoustic signal from client computer C and stores it in a second sound buffer 310 (FIG. 4, 420). Because the first acoustic signal and the second acoustic signal are stored in separate buffers, sound processor 320 can raise the volume of the first acoustic signal and lower the volume of the second acoustic signal. Sound processor 320 is described in greater detail with reference to FIG. 5.

Sound mixer 330 includes a program that communicates with sound processor 320 for mixing the processed acoustic signals to generate a mixed acoustic signal. Sound mixer 330 may use conventional techniques for mixing these acoustic signals. Sound mixer 330 sends the mixed acoustic signal to output device 230 for conversion to sound.

FIG. 4 is a block diagram illustrating details of sound buffers 310, which include active sound buffers 400, overflow sound buffers 450 and environment sound buffers 460.

Active sound buffers 400 include storage buffers for individually storing acoustic signals received from other client computers 110. The number of active sound buffers 400 is preferably determined based on the server 130 bandwidth or on the communications interface 250 bandwidth. For example, a state-of-the-art 14.4 modem may be limited to receiving a maximum of four acoustic signals before the bandwidth of the modem becomes saturated. Thus, server 130 is preferably, for state-of-the-art 14.4 modems, limited to forwarding a maximum of four acoustic signals, and each client computer 110 preferably includes four active sound buffers 400. If a client computer 110 includes less than the maximum number of active sound buffers 400, then overflow control system 150 of server 130 limits the number of acoustic signals being sent at any one time to that number. For example, if client computer 110 bandwidth limits client computer 110 to handling a maximum of two acoustic signals, then client computer 110 preferably includes only two active sound buffers 400 and overflow control system 150 limits server 130 to forwarding a maximum of two acoustic signals.

In the illustrated example, sound buffers 310 include four active sound buffers 400 for storing up to four individual acoustic signals. In client computer A, active sound buffers 400 include a first sound buffer 410 for storing a first acoustic signal representing sounds from client computer B, a second sound buffer 420 for storing a second acoustic signal representing sounds from client computer C, and a third sound buffer 430 and a fourth sound buffer 440 for storing two more acoustic signals representing sounds from two other client computers D.

Overflow sound buffers 450 preferably include the same number of storage buffers as active sound buffers 400, each overflow sound buffer 450 for storing an acoustic signal when active sound buffers 400 are unavailable. The server 130 overflow control system 150 is configured to forward to each client computer 110, the predetermined maximum number of acoustic signals during a predetermined time period which preferably equals the average time (e.g., 250 milliseconds) client computer 110 needs for processing the sounds stored in active sound buffers 410. If after the predetermined time period client computer 110 has not finished processing the first acoustic signal set, then client computer 110 may receive another acoustic signal set from server 130. To prevent data loss on client computer 110, client computer 110 uses overflow sound buffers 450 for storing the additional acoustic signal set.

Environment sound buffers 460 include buffers for individually storing environment sounds such as background sounds, newly-attached client computer 110 identification sounds and other miscellaneous sounds. In the battlefield example, environment sounds may include bomb sounds, gunshot sounds, "new army entering the area" identification sounds (e.g., new client computer 110 joining game), etc. Each of these sounds may be stored in a separate environment sound buffer 460. The number of environment sound buffers 460 is regulated by the complexity of the virtual environment, and is illustrated as four environment sound buffers W, X, Y and Z.

Figure 5:
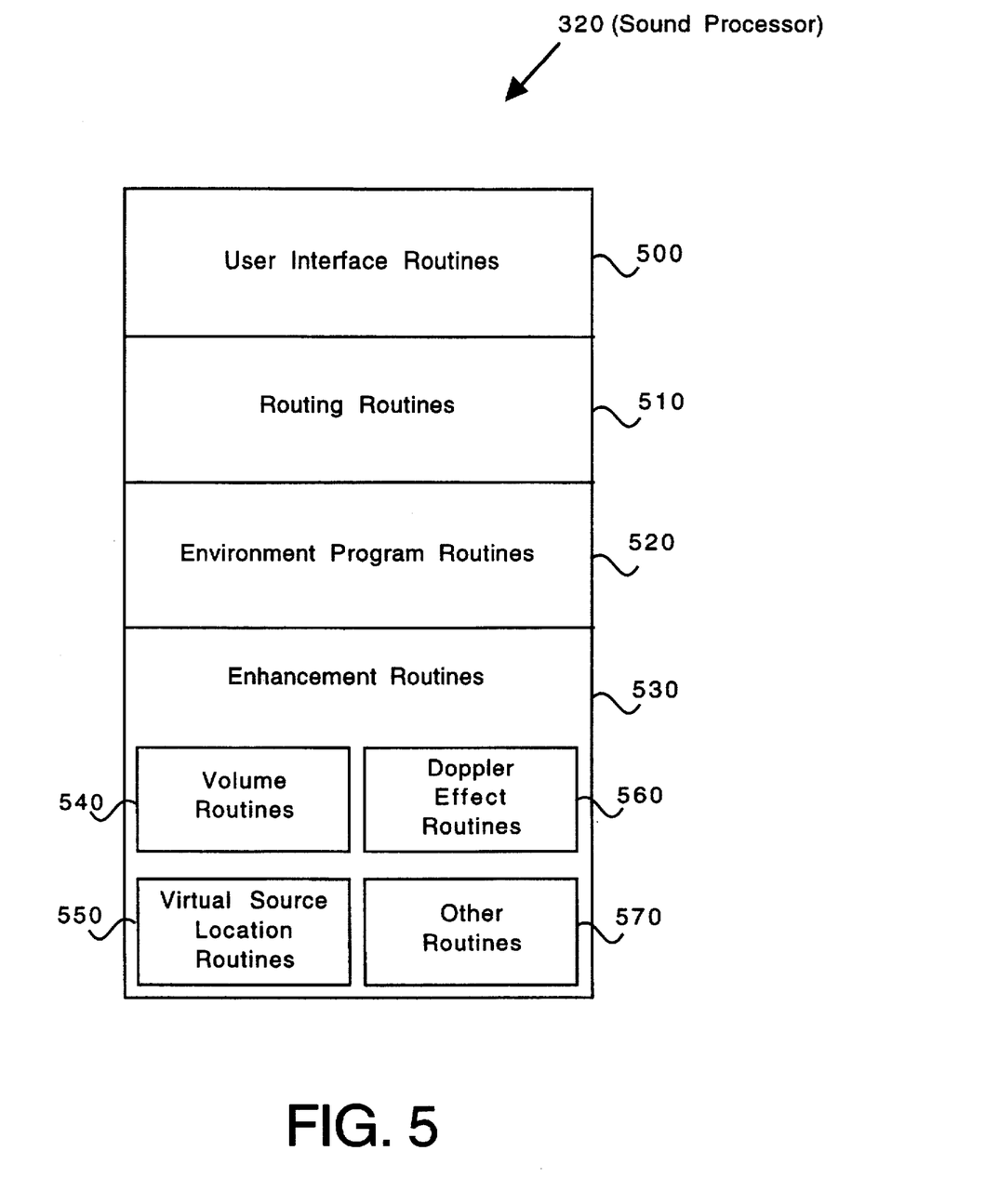
FIG. 5 is a block diagram illustrating details of the FIG. 3 sound processor.

FIG. 5 is a block diagram illustrating details of sound processor 320, which includes user interface routines 500, routing routines 510, environment program routines 520 and enhancement routines 530.

User interface routines 500 control input device 220 to acquire or generate acoustic signals. For example, input device 220 may include a microphone which converts sounds generated locally by a user to acoustic signals, a computer word processor and a program which converts text to acoustic signals, a floppy disk drive for downloading acoustic signals from a floppy disk, or other similar system. Since the user hears the sound or reads the message on the display, the local client computer 110 need not store the locally-generated acoustic signal or mix the locally-generated acoustic signal into the mixed signal. User interface 500 forwards the locally-generated acoustic signal to routing routines 510.

Each client computer's routing routines 510 generate and forward message packets, which include the locally-generated acoustic signals, to the other client computers 110. More particularly, routing routines 510 append to the acoustic signals a source address to form the message packet. Routing routines 510 send the message packet via communications interface 250 through network 120 to server 130, which examines the source address and accordingly forwards the message packet to the appropriate other client computers 110.

Routing routines 510 further receive message packets via communications interface 250 from server 130, and store each received message packet in a separate sound buffer 310. For example, if client computer A receives a first message packet from client computer B and a second message packet from client computer C, then client computer A routing routines 510 store the first message packet in a first sound buffer 310 and the second message packet in a second sound buffer 310. If sound buffers 310 have available active sound buffers 400, then client computer A routing routines 510 store the first message packet in active sound buffer 410 and the second message packet in active sound buffer 420. Otherwise, if there are no available active sound buffers 400, client computer A routing routines 510 store the first message packet in a first overflow sound buffer 450 and the second message packet in a second overflow sound buffer 450.

Environment program routines 520 generate acoustic signals representing virtual environment sounds. If the virtual environment is a battlefield, then environment sounds may include background sounds of war such as gunshots, bombs, etc. Environment program routines 520 use a message packet generation technique similar to that used by routing routines 510. Environment program routines 520 store the environment message packets in separate environment sound buffers 460. For example, a message packet representing bomb sounds may be stored in a first environment sound buffer 460 and a message packet representing gunshots may be stored in a second environment sound buffer 460. Each client computer 110 preferably includes substantially the same environment program routines 520, so that the virtual environment is substantially identical on each client computer 110.

Signal enhancement routines 530 include volume routines 540, virtual source location routines 550, Doppler effect routines 560 and other routines 570. Signal enhancement routines 530 may examine the source address appended to each message packet to determine the intended virtual source of the sound. Based on the intended virtual source, signal enhancement routines 530 enhance the appended acoustic signals. Volume routines 540 control the volume at which to play an acoustic signal on output device 230. Virtual source location routines 550 control which speaker output device 230 is to play the acoustic signal. Doppler effect routines 560 apply Doppler shift algorithms and use multiple speaker output devices 230 to simulate the sounds of moving objects. Other routines 570 may include routines for controlling whether to play a particular sound, routines for controlling the pitch of the sounds played on output device 230 and similar signal enhancement routines. Because the acoustic signals representing the numerous sounds are stored in separate buffers 310, each of the acoustic signals can be enhanced separately. Because each message includes source address data, the appended acoustic signals can be enhanced appropriately.

For example, if client computer A active sound buffer 410 stores a first message packet and a client computer A active sound buffer 420 stores a second message packet, then client computer A enhancement routines 530 can examine the source addresses of the message packets to determine virtual source locations. Client computer A enhancement routines 530 may determine for example that the first message packet is from client computer B for a virtual character located on the left side of the virtual environment and that the second message packet is from client computer C for a virtual character located on the right side of the virtual environment. Client computer A enhancement routines 530 attach pointer data to the first message packet indicating that the acoustic signal is to be played by a speaker output device 230 on the left side of client computer A, and attach pointer data to the second message packet indicating that the acoustic signal is to be played by a speaker output device 230 on the right side of client computer A.

Figure 6:
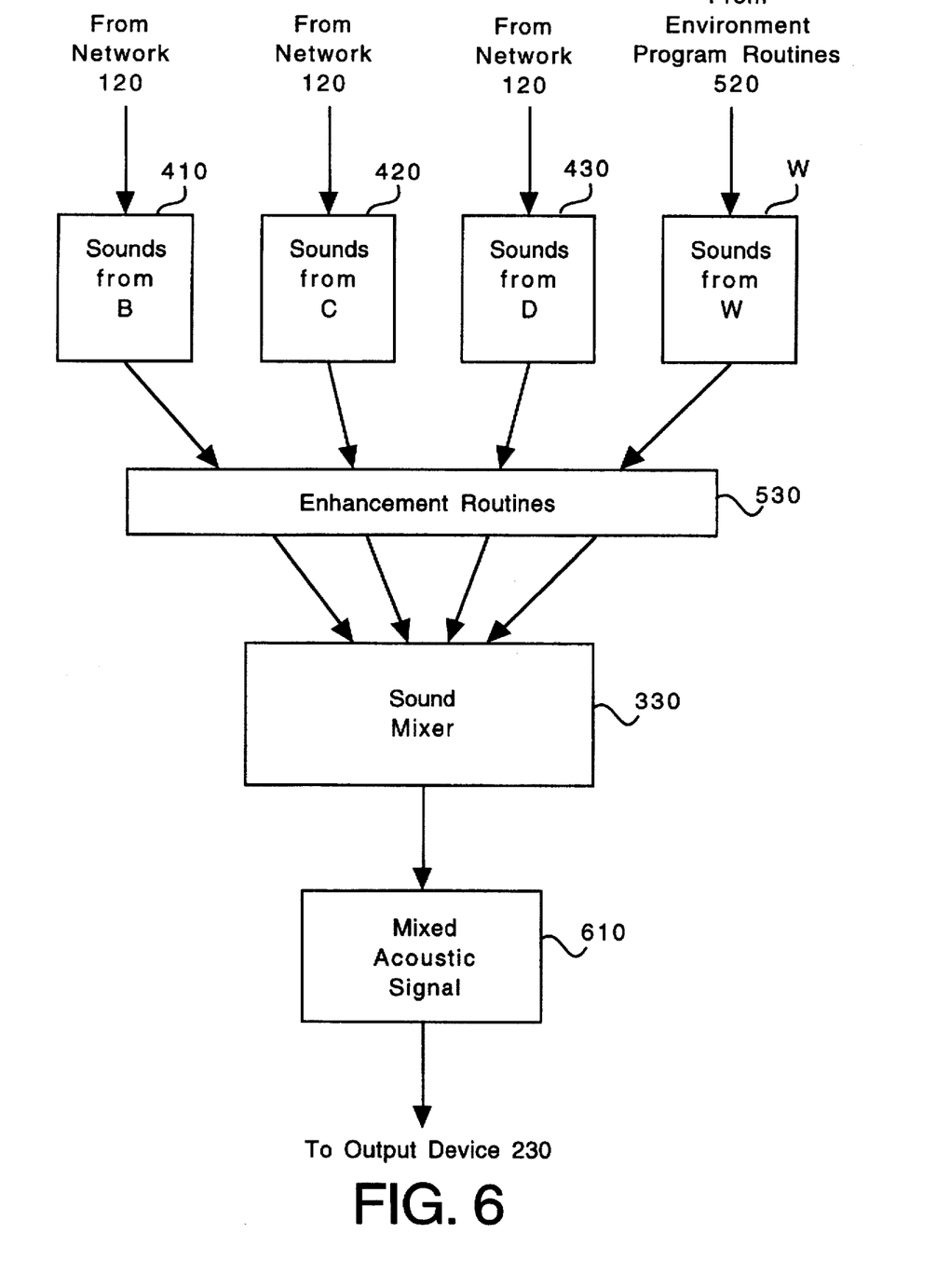
FIG. 6 is a block diagram illustrating operation of the FIG. 3 sound control system.

FIG. 6 is a block diagram illustrating example operations of sound control system 290 for client computer A. Client computer A routing routines 510 receive message packets via computer network 120 from client computer B, client computer C and client computer D. Client computer A routing routines 510 store each of these message packets in a respective active sound buffer 400, for example, in active sound buffer 410, active sound buffer 420 and active sound buffer 430, respectively. Client computer A environment program routines 520 further generate and store an environment message packet in a first environment sound buffer 460, for example, in environment sound buffer W.

Signal enhancement routines 530 examine the source addresses of the message packets stored in active sound buffers 410, 420 and 430 and environment sound buffer 460. Signal enhancement routines 530 enhance each acoustic signal accordingly, and forward the enhanced acoustic signals to sound mixer 330. Sound mixer 330 mixes the enhanced acoustic signals to generate a mixed acoustic signal 610, and then sends the mixed signal 610 to output device 230 for conversion to sound.

Figure 7:
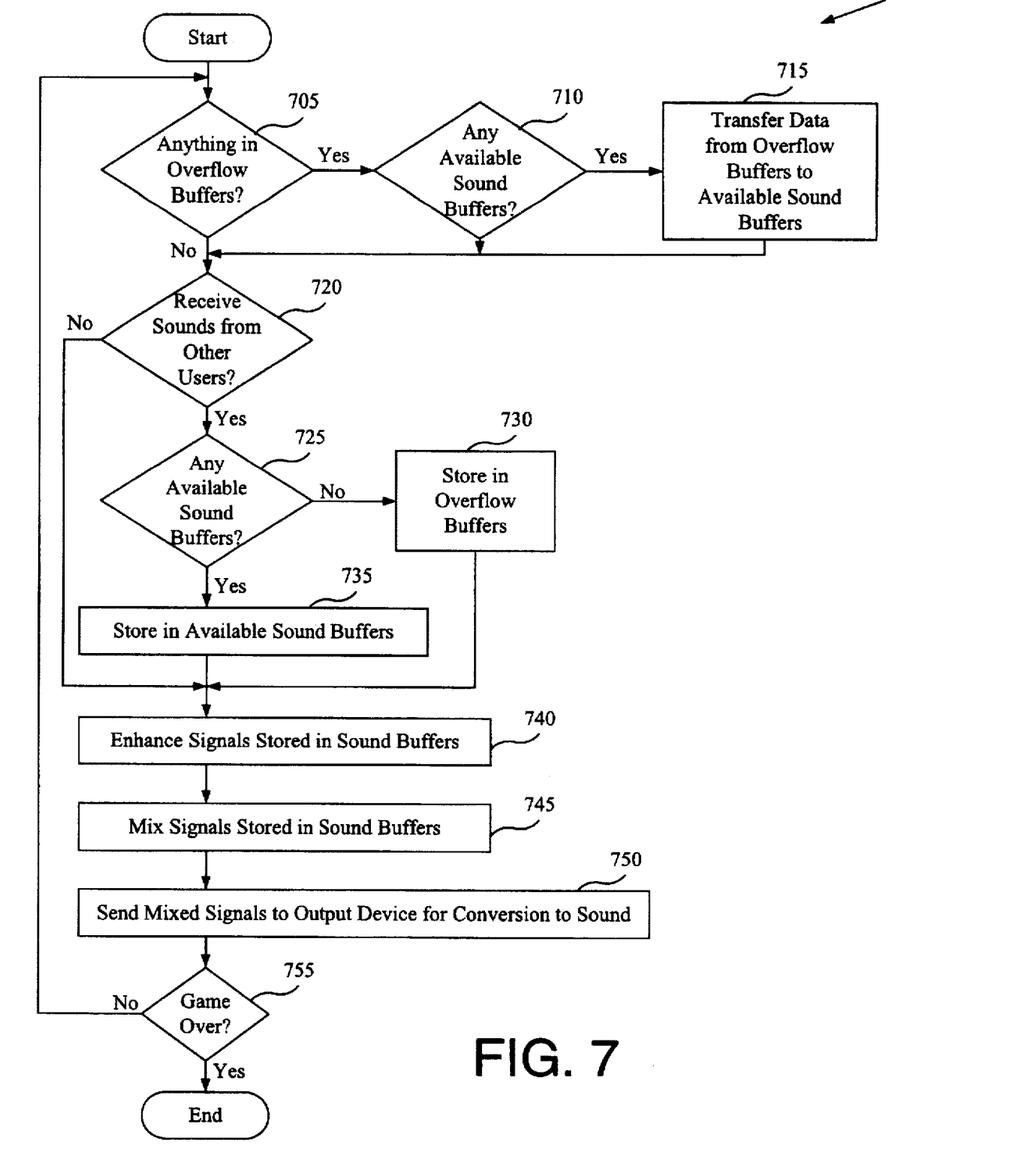
FIG. 7 is a flowchart illustrating a method for communicating digitally-encoded acoustic information between computers.

FIG. 7 is a flowchart illustrating steps in a method 700 for communicating acoustic signals between client computers 110. Method 700 begins in step 705 by routing routines 510 determining whether any acoustic signals are stored in overflow sound buffers 450. If not, then routing routines 510 in step 720 determine whether any message packets (including a source address and an acoustic signal) from other users have been forwarded from server 130. If so, then routing routines 510 in step 725 determine whether any active sound buffers 400 are available. If so, then routing routines 510 in step 735 store the received message packets in the available active sound buffers 400, and in step 740 enhance the acoustic signals included in the message packets which have been stored in active sound buffers 400.

Step 740 includes examining the source address of the message packet to determine the virtual source location for the acoustic signal. For example, if the source address identifies client computer B, the receiving client computer A enhancement routines 530 may determine that client computer B controls a character standing on the left side of the virtual environment, which is the virtual source location. Thus, enhancement control routines 530 can use appropriate enhancements such as volume routines 640, virtual source location routines 550, Doppler effect routines 560 or other routines 570 for enhancing the appended acoustic signal. Step 740 further includes forwarding the enhanced acoustic signals to sound mixer 330.

Sound mixer 330 in step 745 mixes together the enhanced acoustic signals of the message packets which are stored in active sound buffers 400 and in environment sound buffers 460 to generate a mixed signal. Sound mixer 330 in step 750 sends the mixed signal to output device 230 for conversion to sound. Following step 750, if the game ends in step 755, then method 700 ends. Otherwise, method 700 returns to step 705.

If routing routines 510 in step 705 determine that overflow message packets are currently stored in overflow sound buffers 450, then routing routines 510 in step 710 determine whether there are any available active sound buffers 400. If so, then routing routines 410 in step 715 transfer the message packets from overflow sound buffers 450 to active sound buffers 400. If not, then method 700 jumps from step 710 to step 720.

If routing routines 510 in step 720 receive no sounds from other attached client computer 110 users, then method 700 jumps to step 740. Further, if routing routines 510 in step 725 determine that active sound buffers 400 are unavailable, then routing routines 510 in step 730 store the received message packets in overflow sound buffers 450, and then jump to step 740.

The foregoing description of the preferred embodiments of the invention is by way of example only, and other variations of the above-described embodiments and methods are provided by the present invention. Components of this invention may be implemented using a programmed general purpose digital computer, using application specific integrated circuits, or using a network of interconnected conventional components and circuits. The embodiments described herein are presented for illustration and are not intended to be exhaustive or limiting. The system is limited only by the following claims.

What is claimed is:

1. A method for communicating sound between computers, comprising the steps of:
   using a receiver computer for
      receiving via a computer network a first digitally-encoded acoustic signal from a first computer and a second digitally-encoded acoustic signal from a second computer;
      storing the first digitally-encoded acoustic signal in a first memory portion and the second digitally-encoded acoustic signal in a second memory portion;
      processing the first digitally-encoded acoustic signal and the second digitally-encoded acoustic signal;
      mixing the processed first digitally-encoded acoustic signal and the processed second digitally-encoded acoustic signal to generate a mixed digitally-encoded acoustic signal; and
      converting the mixed digitally-encoded acoustic signal to sound.

2. The method of claim 1, wherein:
   the step of receiving comprises receiving a first message packet which includes first identification data and the first digitally-encoded acoustic signal, and a second message packet which includes second identification data and the second digitally-encoded acoustic signal; and
   the step of processing comprises processing the first digitally-encoded acoustic signal based on the first identification data and processing the second digitally-encoded acoustic signal based on the second identification data.

3. The method of claim 2, wherein each of the first and second identification data comprises source address data.

4. The method of claim 1, wherein the first memory portion comprises a first storage buffer and the second memory portion comprises a second storage buffer.

5. The method of claim 1, wherein the step of processing comprises enhancing the first and second acoustic signals.

6. The method of claim 5, wherein the step of enhancing comprises adjusting the volume and a virtual source location of the first and second acoustic signals.

7. The method of claim 1, wherein the step of storing comprises:
   storing the first digitally-encoded acoustic signal in a first active sound storage buffer if said first active buffer is available and in a first overflow sound buffer if said first active buffer is not available, and storing the second digitally-encoded acoustic signal in a second active sound buffer if said second active buffer is available and in a second overflow storage buffer if said second active buffer is not available.

8. The method of claim 1, further comprising the steps of:
   generating a plurality of separate environment digitally-encoded acoustic signals;
   storing the environment digitally-encoded acoustic signals separately in environment memory portions;
   processing the stored environment digitally-encoded acoustic signals separately;
   mixing the processed environment digitally-encoded acoustic signals to generate a second mixed digitally-encoded acoustic signal; and
   converting the second mixed digitally-encoded acoustic signal to sound.

9. The method of claim 1, further comprising the steps of:
   generating a plurality of environment digitally-encoded acoustic signals;

storing the environment digitally-encoded acoustic signals separately in environment memory portions; and processing the stored environment digitally-encoded acoustic signals separately; and wherein the step of mixing mixes in the processed environment digitally-encoded acoustic signals to generate the mixed digitally-encoded acoustic signal.

10. A system for communicating sound between computers, comprising:

means for receiving via a computer network a first digitally-encoded acoustic signal from a first computer and a second digitally-encoded acoustic signal from a second computer;

means for storing the first digitally-encoded acoustic signal and the second digitally-encoded acoustic signal separately; and means for processing the first digitally-encoded acoustic signal and the second digitally-encoded acoustic signal separately;

means for mixing the first digitally-encoded acoustic signal and the second digitally-encoded acoustic signal to generate a mixed digitally-encoded acoustic signal; and means for converting the mixed digitally-encoded acoustic signal to sound.

11. The system of claim 10 wherein:

said means for receiving receives a first message packet which includes first identification data and the first digitally-encoded acoustic signal, and a second message packet which includes second identification data and the second digitally-encoded acoustic signal; and said means for processing includes means for enhancing the first digitally-encoded acoustic signal based on the first identification data and enhancing the second digitally-encoded acoustic signal based on the second identification data.

12. The system of claim 11 wherein each of the first and second identification data comprises source address data.

13. The system of claim 10 wherein said means for storing comprises a first storage buffer and a second storage buffer.

14. The system of claim 10 wherein said means for processing comprises means for enhancing the first and second digitally-encoded acoustic signals.

15. The system of claim 14 wherein said means for enhancing comprises:

means for adjusting volumes of the first digitally-encoded acoustic signal and of the second digitally-encoded acoustic signal; and mean for adjusting virtual source locations of the first digitally-encoded acoustic signal and of the second digitally-encoded acoustic signal.

16. The system of claim 10 wherein said means for storing comprises:

a first active sound storage buffer for storing the first digitally-encoded acoustic signal;

a second active sound buffer for storing the second digitally-encoded acoustic signal;

a first overflow sound buffer for storing the first digitally-encoded acoustic signal when the active sound buffers are unavailable; and a second overflow storage buffer for storing the second digitally-encoded acoustic signal when the active sound buffers are unavailable.

17. The system of claim 10, further comprising:

means for generating a plurality of environment digitally-encoded acoustic signals;

means for storing the environment digitally-encoded acoustic signals separately; and means for processing the stored environment digitally-encoded acoustic signals separately.

18. A computer-readable storage medium storing program code for causing a computer to perform the steps of:

receiving via a computer network a first digitally-encoded acoustic signal from a first computer and a second digitally-encoded acoustic signal from a second computer;

storing the first digitally-encoded acoustic signal in a first memory portion and the second digitally-encoded acoustic signal in a second memory portion;

processing the first digitally-encoded acoustic signal and the second digitally-encoded acoustic signal;

mixing the processed first digitally-encoded acoustic signal and the processed second digitally-encoded acoustic signal to generate a mixed digitally-encoded acoustic signal; and converting the mixed digitally-encoded acoustic signal to sound.

19. A system for processing digitally-encoded acoustic information provided by computers in a computer network, comprising:

a communications interface coupled to a computer network for receiving digitally-encoded acoustic signals from computers in the computer network;

memory coupled to the communications interface for storing separately the received digitally-encoded acoustic signals;

a sound processor coupled to the memory for enhancing separately the stored digitally-encoded acoustic signals; and a sound mixer coupled to the sound processor for mixing the processed digitally-encoded acoustic signals to produce a mixed signal.

20. The system of claim 19, further comprising an output device coupled to the sound mixer for translating the mixed signal to sound.

21. The system of claim 19 wherein:

said communications interface receives message packets which include digitally-encoded acoustic signals and identification data; and said sound processor includes means for enhancing the stored digitally-encoded acoustic signals based on said identification data.

22. The system of claim 21, wherein said identification data comprises source address data.

23. The system of claim 19, wherein said memory comprises a set of individual storage buffers.

24. The system of claim 19, wherein said sound processor comprises means for enhancing said digitally-encoded acoustic signals.

25. The system of claim 24, wherein said means for enhancing comprises:

means for adjusting the volume; and means for adjusting a virtual source location of said digitally-encoded acoustic signals.

26. The system of claim 19, wherein said memory comprises:

active sound storage buffers for storing the digitally-encoded acoustic signals; and overflow sound buffers coupled to said active storage buffers for storing said digitally-encoded acoustic signals when said active sound buffers are unavailable.

27. The system of claim 19, further comprising:

means, coupled to said sound mixer, for generating environment digitally-encoded acoustic signals;

means, coupled to said means for generating, for storing separately said environment digitally-encoded acoustic signals; and an environment sound processor, coupled to said means for storing, for processing separately the stored environment digitally-encoded acoustic signals.

28. A system for processing digitally-encoded acoustic information provided by computers in a computer network, comprising:

a user interface for converting sound to first digitally-encoded acoustic signals;

a router coupled to said user interface and to said computer network for sending said first digitally-encoded acoustic signals to said computer network, and for receiving second digitally-encoded acoustic signals from computers in said computer network;

sound buffers coupled to said router for storing individually the second digitally-encoded acoustic signals;

an enhancement element coupled to said router for processing individually the second digitally-encoded acoustic signals stored in the sound buffers; and a sound mixer coupled to said enhancement element for mixing said processed second digitally-encoded acoustic signals to generate a mixed digitally-encoded acoustic signal.

29. The system of claim 28 wherein said user interface comprises a microphone.

30. The system of claim 28 further comprising an output device coupled to said sound mixer for translating said mixed signal to sound.

31. The system of claim 28, wherein the sound buffers comprise active sound storage buffers and overflow sound buffers coupled together.

32. The system of claim 31 wherein the router stores the digitally-encoded acoustic signals in the active sound buffers when available and in the overflow sound buffers when the active sound buffers are not available.

33. The system of claim 28 wherein said means for enhancing comprises:

means for adjusting the volume; and mean for adjusting a virtual source location of said digitally-encoded acoustic signals.

34. The system of claim 28, further comprising:

means, coupled to said sound mixer, for generating environment digitally-encoded acoustic signals;

means, coupled to said means for generating, for storing separately said environment digitally-encoded acoustic signals; and an environment sound processor, coupled to said means for storing, for processing separately said stored environment digitally-encoded acoustic signals.

* * * * *